United States Patent
Nyamars

(10) Patent No.: US 10,884,725 B2
(45) Date of Patent: Jan. 5, 2021

(54) ACCESSING CONTAINER IMAGES IN A DISTRIBUTED LEDGER NETWORK ENVIRONMENT

(71) Applicant: Wipro Limited, Bangalore (IN)

(72) Inventor: Sreekanth Nyamars, Bangalore (IN)

(73) Assignee: Wipro Limited, Bangalore (IN)

(*) Notice: Subject to any disclaimer, the term of this patent is extended or adjusted under 35 U.S.C. 154(b) by 99 days.

(21) Appl. No.: 16/367,840

(22) Filed: Mar. 28, 2019

(65) Prior Publication Data

US 2020/0310775 A1  Oct. 1, 2020

(30) Foreign Application Priority Data

Mar. 27, 2019 (IN) .............................. 201941012063

(51) Int. Cl.
| | |
|---|---|
| *G06F 8/61* | (2018.01) |
| *G06F 8/65* | (2018.01) |
| *G06Q 20/38* | (2012.01) |
| *H04L 9/32* | (2006.01) |
| *G06F 16/182* | (2019.01) |

(52) U.S. Cl.
CPC .................. *G06F 8/63* (2013.01); *G06F 8/65* (2013.01); *G06F 16/1824* (2019.01); *G06Q 20/382* (2013.01); *H04L 9/3263* (2013.01); *H04L 2209/38* (2013.01)

(58) Field of Classification Search
CPC ...... G06F 8/63; H04L 9/3263; H04L 2209/38
See application file for complete search history.

(56) References Cited

U.S. PATENT DOCUMENTS

| | | | |
|---|---|---|---|
| 10,600,050 B1* | 3/2020 | Anton | H04L 9/3255 |
| 2016/0260095 A1* | 9/2016 | Ford | G06F 21/64 |
| 2018/0032383 A1* | 2/2018 | Surcouf | H04L 9/088 |
| 2018/0137306 A1 | 5/2018 | Brady et al. | |
| 2018/0167217 A1* | 6/2018 | Brady | H04L 67/10 |

(Continued)

OTHER PUBLICATIONS

Ihle et al. "Smart Contract-Based Role Management on the Blockchain." Business Information Systems Workshops. (Year: 2019).*

(Continued)

*Primary Examiner* — Benjamin C Wu
(74) *Attorney, Agent, or Firm* — Finnegan, Henderson, Farabow, Garrett & Dunner, LLP

(57) ABSTRACT

A technique is provided for accessing container images in a distributed ledger network environment, in which, basis the receipt of a request from a consumer for accessing the container images, it is determined whether the container images require to be generated based on a customization performed on pre-published container images. The pre-published container images are updated in the nodes of the distributed ledger network, based on at least public keys of publishers of the pre-published container images, smart contracts, and certificates associated with the publisher. Based on the determined requirement, features for performing the customization are extracted based on inputs received from the consumer and a set of pre-published container images are identified from the pre-published container images and associated metadata from respective nodes of the network. The customized container images are generated based on reconciliation of the metadata of the identified set of pre-published container images.

19 Claims, 6 Drawing Sheets

(56) References Cited

U.S. PATENT DOCUMENTS

| | | | | |
|---|---|---|---|---|
| 2018/0176229 | A1* | 6/2018 | Bathen | H04L 9/3239 |
| 2018/0343111 | A1* | 11/2018 | Chen | G06F 9/455 |
| 2019/0020665 | A1* | 1/2019 | Surcouf | H04L 9/3236 |
| 2019/0102409 | A1* | 4/2019 | Shi | G06F 16/1834 |
| 2019/0102423 | A1* | 4/2019 | Little | G06F 21/6218 |
| 2019/0104196 | A1* | 4/2019 | Li | G06Q 20/382 |
| 2019/0205121 | A1* | 7/2019 | Ericson | H04L 9/0643 |
| 2020/0082025 | A1* | 3/2020 | Zhou | G06F 9/00 |
| 2020/0127861 | A1* | 4/2020 | Doshi | H04L 41/145 |
| 2020/0142986 | A1* | 5/2020 | Ragnoli | G06Q 30/08 |
| 2020/0167145 | A1* | 5/2020 | Franchitti | G06F 8/65 |
| 2020/0241929 | A1* | 7/2020 | Arrasjid | H04L 41/5029 |
| 2020/0252406 | A1* | 8/2020 | Padmanabhan | H04L 63/102 |

OTHER PUBLICATIONS

Wang, S. et al. "Blockchain-Enabled Smart Contracts: Architecture, Applications, and Future Trends." IEEE Transactions on Systems, Man, and Cybernetics: Systems 49. (Year: 2019).*

Westerlund et al. "Towards Distributed Clouds." (Year: 2018).*

GitHub—DaoCloud/daochain: Docket image verification system based on Ethereum, last retrieved from the internet Mar. 28, 2019: <https://github.com/DaoCloud/daochain>.

MESMUR is a container with a decentralized blockchain technology, has a high level of security, Jun. 13, 2018, retrieved from the internet: <https://medium.com/@pilotzena/mesmr-is-a-container-with-a-decentralized-blockchain-technology-has-a-high-level-of-security-566efd6cc592>.

Ibmblockchain/fabric-peer, Mar. 28, 2019, retrieved from the internet: <https://hub.docker.com/r/ibmblockchain/fabric-peer/>.

IBM LinuxONE Quick Start Guide v2.3, IBM Corporation,(2016), retrieved from the internet: <https://developer.ibm.com/linuxone/wp-content/uploads/sites/57/blockchain-quick-start.pdf>.

Vizard, M., IBM Couples Docket Containers to Blockchain Database, Container Journal, Mar. 22, 2017, retrieved from the internet: <https://containerjournal.com/2017/03/22/ibm-couples-docker-containers-blockchain-database/>.

* cited by examiner

ACCESSING CONTAINER IMAGES IN A DISTRIBUTED LEDGER NETWORK ENVIRONMENT

This application claims the benefit of Indian Patent Application Serial No. 201941012063, filed Mar. 27, 2019, which is hereby incorporated by reference in its entirety.

FIELD

This disclosure relates generally to accessing container images, and more particularly to system and method for accessing container images in a distributed ledger network environment.

BACKGROUND

Recently, cloud has become the new standard platform to build, deploy and run applications. Typically, successful running of applications on a cloud platform requires packaging all the relevant dependencies of the application together so that the application can run autonomously in cloud. Traditionally, one or more known ways of packaging such dependencies along with application is a cumbersome and error-prone process. To address the packaging issue, an existing mechanism of containerization packages the dependencies into a light-weight distribution called containers. The artifact thus containerized into containers is referred to as image. An image may be created by a stakeholder that intends to run a piece of software or application in the cloud. Further, image contains operating system libraries, application artifacts, and dependencies, which enable the application to run as a coherent unit. Typically, images require an operating system and a set of dependent libraries to run the application which is packaged inside the image. Once the images are deployed, they run as containers. Additionally, the images may be stored in specifically designed repositories, which can understand the structure of the images as well as provide application program interfaces (API's) to manage the images. Such repositories can be classified as public, private, or protected, in accordance with the business requirements across enterprises. However, such images containing application, operating system libraries, and the related dependencies are susceptible to potential library corruptions and thus may be tampered by external agent to contain malicious piece of code or vulnerable libraries, thus adversely impacting the business.

Various mechanisms exist to address the security issues noted above. On such process of certifying the image's security is termed as image provenance. Image provenance ensures that the images are free from any vulnerabilities, malicious patches and hence certifies the source of Image and the contents in the image. An example of existing mechanism is Notary that helps to manage the provenance of the images, which are stored in a given repository. Notary is a client server software which requires public key infrastructure (PKI) to enable the authentication and authorization. Every enterprise requires to setup a PKI infrastructure to participate in image signing and provenance management.

However, there are various technical challenges with provenance mechanism that exist today. As a first, there is no standard mechanism to govern the cross enterprise, cross cloud service provider container repositories. Further, given that PKI infrastructure come with lot external dependencies, it is very complex to setup and manage PKI platform for any enterprise. Furthermore, currently the existing mechanism for discovering the image ownership are manual and there is no automated mechanism for this purpose. Also, the existing image provenance verification mechanisms require inherent knowledge of PKI process and libraries to ascertain the provenance. These libraries are resource intensive and could lead to performance issues in large scale enterprises repositories. In addition to the above, currently there is no standard certification authority for image provenance of images. As a result, every enterprise maintains their own internal governance in this regard. As a part of image dependency management, the existing techniques allow multiple publishers to modify the base image, which can result in multiple versions of the same image thereby leaving no mechanism for managing the distributed versions of same image.

Therefore, currently there is no systematic mechanism having the ability to track the dependencies automatically and track the changes introduced by various publishers other than manually tracking the changes based on annotations which are optional. Further, there is no mechanism that has the additional feature of merging images and corresponding dependencies and features, based on consumer's choice for creating an image dynamically on demand. Further, currently there is no mechanism to capture the audit trail.

SUMMARY

In one embodiment, a method of accessing container images in a distributed ledger network environment is disclosed. In one example, the method includes receiving, by a container image accessing system, a request from a consumer for accessing one or more container images in a container image database. The method further includes, determining, by the container image accessing system, whether the one or more container images require to be generated based on a customization performed on one or more container images pre-published in the container image database. The one or more pre-published container images are updated in the one or more nodes of the distributed ledger network, based on at least public keys of publishers of the one or more pre-published container images, one or more smart contracts, and one or more certificates associated with the publishers. The method further includes extracting, by the container image accessing system, based on the determined requirement, one or more features for performing the customization, based on one or more inputs received from the consumer. The method further includes identifying, by the container image accessing system, corresponding to the extracted one or more features, a set of pre-published container images from the one or more pre-published container images and associated metadata from respective nodes of the distributed ledger network. The method further includes generating, by the container image accessing system, the customized one or more container images corresponding to the access request, based on reconciliation of the metadata of the identified set of pre-published container images.

In another embodiment, a system is disclosed for accessing container images in a distributed ledger network environment. The system includes a processor and a memory communicatively coupled to the processor. The memory stores processor-executable instructions, which, on execution, cause the processor to receive a request from a consumer for accessing one or more container images in a container image database. The processor-executable instructions, on execution, further cause the processor to determine whether the one or more container images require to be generated based on a customization performed on one or more container images pre-published in the container image database. The one or more pre-published container images are updated in the one or more nodes of the distributed ledger network, based on at least public keys of publishers of the one or more pre-published container images, one or more smart contracts, and one or more certificates associated with the publishers. The processor-executable instructions, on execution, further cause the processor to extract, based on the determined requirement, one or more features for performing the customization, based on one or more inputs received from the consumer. The processor-executable instructions, on execution, further cause the processor to identify, corresponding to the extracted one or more features, a set of pre-published container images from the one or more pre-published container images and associated metadata from respective nodes of the distributed ledger network. The processor-executable instructions, on execution, further cause the processor to generate the customized one or more container images corresponding to the access request, based on reconciliation of the metadata of the identified set of pre-published container images.

In yet another embodiment, a non-transitory computer-readable medium storing computer-executable instructions accessing container images in a distributed ledger network environment is disclosed. In one example, the stored instructions, when executed by a processor, cause the processor to perform operations comprising receiving a request from a consumer for accessing one or more container images in a container image database. The operations further include determining whether the one or more container images require to be generated based on a customization performed on one or more container images pre-published in the container image database. The one or more pre-published container images are updated in the one or more nodes of the distributed ledger network, based on at least public keys of publishers of the one or more pre-published container images, one or more smart contracts, and one or more certificates associated with the publishers. The operations further include extracting based on the determined requirement, one or more features for performing the customization, based on one or more inputs received from the consumer. The operations further include identifying corresponding to the extracted one or more features, a set of pre-published container images from the one or more pre-published container images and associated metadata from respective nodes of the distributed ledger network. The operations further include generating the customized one or more container images corresponding to the access request, based on reconciliation of the metadata of the identified set of pre-published container images.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
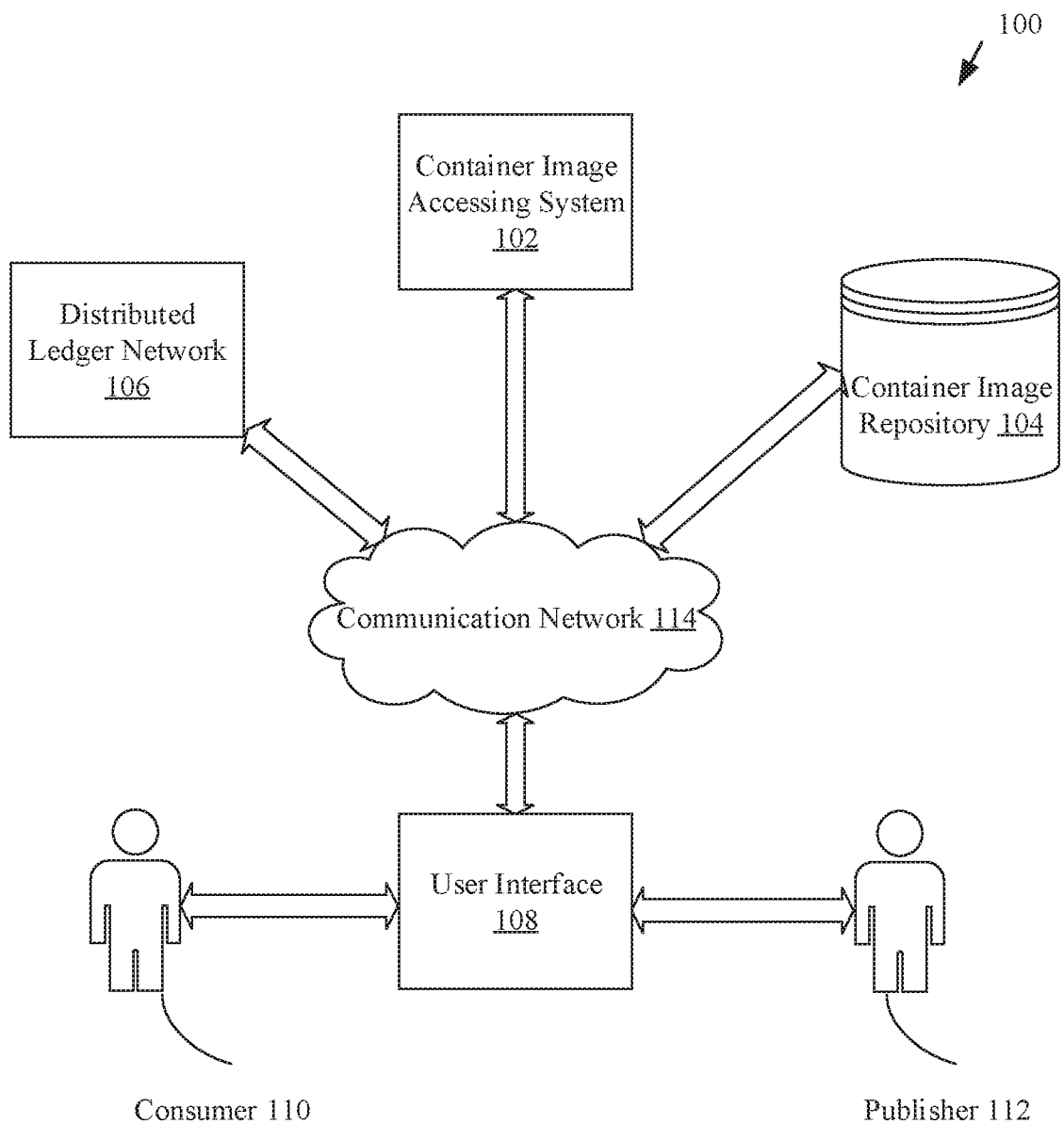
FIG. 1 is an exemplary network environment for accessing one or more container images in a distributed ledger network environment, in accordance with some embodiments of the present disclosure.

Referring now to FIG. 1, an exemplary network environment 100 for accessing one or more container images in distributed ledger network environment, is shown in accordance with some embodiments of the present disclosure.

The network environment 100 includes a network of computing devices (e.g., a computer, a server, a digital device, a router, a modem, a bridge, a switch, etc.) for accessing container images. In one embodiment, the network environment 100 includes a container image accessing system 102, a container image repository 104, a distributed ledger network 106, a user interface 108, a consumer 110, and a publisher 112. The container image accessing system 102, the container image repository 104, the distributed ledger network 106, the user interface 108, the consumer 110, and the publisher 112, may be communicatively coupled to each other, via the communication network 114.

Each of the computing devices further includes one or more processors and a computer-readable medium (e.g., a memory). The computer-readable storage medium stores instructions that, when executed by the one or more processors, cause the one or more processors to perform data reception and transmission in accordance with aspects of the present disclosure. The computer-readable storage medium may also store various data (e.g., optimal network path, optimal packet size, data packets, current packet size of a node, etc.) that may be captured, processed, and/or required by the network environment 100.

The container image accessing system 102 may include suitable logic, circuitry, interfaces, and/or code for receiving request from consumer 110 for accessing container images, via the user interface 108. The container image accessing system 102, while leveraging the authentication and authorization functionality of the distributed ledger network 106, may cater to the access request of the consumer 110, by either retrieving the requested container image from the container image repository 104, or by generating the container image using one or more container images pre-published in the container image repository 104. The container image accessing system 102 may further receive a request, via the user interface 108, from a publisher 112 for publishing one or more container images in the container image repository 104. The container image accessing system 102 may update the container image repository 104 with the container image provided by the publisher 112.

The container image repository 104 may include suitable logic, circuitry, interfaces, and/or code for storing the container images which are published by the publisher 112 and are signed by one or more nodes of the distributed ledger network 106. The container image accessing system 102 interacts with the consumer 110 and the publisher 112 for facilitating the access to the container images. Examples of implementation of the container image repository 104 may include, but are not limited to, relational databases, operational databases, a database warehouses, distributed databases, or end-user databases. A person of ordinary skill in the art will appreciate that in an implementation, the container image repository 104 may be integrated with the container image accessing system 102, without limiting the scope of the disclosure. In an alternate implementation, the container image repository 104 may be implemented as an entity that may be remotely placed with respect to the container image accessing system 102 (as depicted in FIG. 1).

The distributed ledger network 106 may include suitable logic, circuitry, interfaces, and/or code for authenticating and authorizing the requests for accessing the container images and/or publishing the container images. The distributed ledger network 106, for the purpose of performing operations relating to container image provenance, may include a plurality of nodes for digitally signing the container images or modifications made thereto, by use of one or more cryptographic tools. In an implementation, the distributed ledger network 106 may be realized based on a Blockchain network, Hashgraph network, a permissioned Blockchain network, or a Hyperledger fabric. A person of ordinary skill in the art will appreciate that in an implementation, the one or more node of the distributed ledger network 106 may be integrated with the container image accessing system 102, without limiting the scope of the disclosure. In an alternate implementation, the distributed ledger network may be implemented as a separate network of nodes that may be remotely placed with respect to the container image accessing system 102 (as depicted in FIG. 1).

The user interface 108 may include suitable logic, circuitry, interfaces, and/or code for based on which the consumer 110 or the publisher 112 may be able to view information corresponding to the container images that is required to be accessed. In case of an access request received from the consumer 110, the container image accessing system 102 may present a list of container images published in the container image repository 104 to the consumer, by use of JavaScript Object Notation (JSON) object that may be rendered on the user interface 108. Using the user interface 108, the container image accessing system 102 may further receive one or more inputs, from the consumer 110, corresponding to desired features of a container image. Similarly, in case of a request for publishing one or more container images received from the publisher 112, the container image accessing system 102 may present one or more options to the publisher based on which it determines whether the publisher intends to modify one or more pre-published container images or intends to publish a new container image. Additionally, the user interface 108 solicits one or more credentials from the consumer 110 and the publisher 112 for authenticating and authorizing the access to the container images. Examples of the user interface 108 may include, but are not limited to, a smartphone, a camera, a tablet computer, a laptop, a wearable electronic device, and/or other such computing devices. Examples of implementation of the display screen (that may be associated with the user interface 108) may include, but are not limited to, a Liquid Crystal Display (LCD) display, a Light Emitting Diode (LED) display, an Organic LED (OLED) display technology. A person of ordinary skill in the art will appreciate that in an implementation, the user interface 108 may be integrated with the container image accessing system 102, without limiting the scope of the disclosure. In an alternate implementation, the user interface 108 may be implemented as an entity that may be remotely placed with respect to the container image accessing system 102 (as depicted in FIG. 1).

The communication network 114 may include a medium through which the container image accessing system 102, container image repository 104, distributed ledger network 106, the user interface 108, the consumer, and the publisher 112 present in the network environment 100 may communicate with each other. Examples of the communication network 114 may include, but are not limited to, the Internet, a cloud network, a Wireless Fidelity® (Wi-Fi) network, a Wireless Local Area Network (WLAN), a Local Area Network (LAN), a telephone line (POTS), Long Term Evolution (LTE), and/or a Metropolitan Area Network (MAN). Various devices in the exemplary network environment 100 may be configured to connect to the communication network 114, in accordance with various wired and wireless communication protocols. Examples of such wired and wireless communication protocols may include, but are not limited to, Transmission Control Protocol and Internet Protocol (TCP/IP), User Datagram Protocol (UDP), Hypertext Transfer Protocol (HTTP), File Transfer Protocol (FTP), Zigbee, EDGE®, Infrared® (IR), IEEE® 802.11, 802.16, cellular communication protocols, and/or Bluetooth® (BT) communication protocols.

In operation, the container image accessing system 102 may register one or more users that may intend to access or publish container images from the container image repository 104. The registration may be based on one or more credentials provided by the users to the container image accessing system 102 by use of the user interface 108. In an embodiment, the registered user may correspond to the consumer 110, in which case, the access request received from the user may correspond to a request for accessing features (or a combination of features) of one or more container images pre-published in the container image repository 104. In an embodiment, the registered user may correspond to the publisher 112, in which case, the access request received from the user may correspond to a request for modifying one or more container images pre-published in the container image repository 104 or creating one or more container images to be published in the container image repository 104.

In an embodiment, the requests received from the consumer 110 or the publisher 112 may further include metadata associated with the one or more container images. In an embodiment, the metadata may include, but is not limited to, names of the one or more container images, locations on a local file system where the one or more container images have been generated, one or more tags with which the publisher intends to associate the one or more container images, a list of features associated with the one or more container images, a list of modified features associated with the one or more container images, a date of creation or modification of each container image from the one or more container images, and one or more dependencies associated with the one or more container images.

For a request received from the publisher 112, via one or more JSON objects presented to the publisher 112 in the user interface 108, the container image accessing system 102 may first verify the identity of the publisher 112 based on one or more credentials received from the publisher 112. The container image accessing system 102 may further verify the metadata associated with the one or more container images.

Upon successful verification of the identity of the publisher 112 and the metadata associated with the one or more container images, the container image accessing system 102 may categorize the request received from the publisher 112 into a request for creating a new container image, a request for creating a new container image, a request for fixing an issue in one or more container pre-published container images, a request for enhancing one or more pre-published container images with one or more features, a request for deleting one or more pre-published container images.

Post the categorization, when it is determined that the request corresponds to a request for creating a new container image, the container image accessing system 102 may authenticate the publisher 112 against the distributed ledger network 106 based on the one or more credentials. Post authentication, the container image accessing system 102 may generate verified container image data that includes, but is not limited to, a distributed ledger transaction identification (ID), public certificate details, version of the container image at the time of transaction related to the distributed ledger network 106, a dependency list associated with the container image, one or more features included in the container image.

In an embodiment, the container image accessing system 102 may serialize the verified container image into a distributed ledger network compatible format. The container image accessing system 102 may further update the serialized container image in one or more nodes of the distributed ledger network 106, based on at least a public key of the publisher 112, one or more smart contracts, and one or more certificates associated with the publisher 112. Subsequently, the container image accessing system 102 may publish the one or more container images in the container image repository 104 by converting the updated container image into a serializable container image. The published one or more container images may be accessed by one or more consumers (such as the consumer 110), based on a request received from the one or more consumers for accessing the published one or more container images.

Post the categorization, when it is determined that the request corresponds to a request for fixing an issue in one or more container pre-published container images, a request for enhancing one or more pre-published container images with one or more features, a request for deleting one or more pre-published container images, the one or more container images are streamed as byte input based on verification of metadata of each container image from the one or more container images. The verification includes reconciling the metadata of each container image from the one or more container images and the corresponding container images stored in the container image repository 104, based on an invocation of a smart contract digest from the one or more nodes of the distributed ledger network.

The container image accessing system 102 may then serialize the container image into a distributed ledger network compatible format. The container image accessing system 102 may further update the serialized container image in one or more nodes of the distributed ledger network 106, based on at least a public key of the publisher 112, one or more smart contracts, and one or more certificates associated with the publisher 112. Thereafter, the container image accessing system 102 may publish the one or more modified container images in the container image repository 104 by converting the updated container image into a serializable container image. The one or more container images thus modified may be accessed by one or more consumers (such as the consumer 110), based on a request received from the one or more consumers for accessing the published one or more container images.

For a request received from the consumer 110, via one or more JSON objects presented to the consumer 110 in the user interface 108, the container image accessing system 102 may verify the identity of the consumer 110 based on one or more credentials received from the consumer 110. The request may include specific details of the one or more container images and/or one or more features that the consumer 110 intends to use from the one or more container images. In an embodiment, the container image accessing system 102 in conjunction with the container image repository 104 and the user interface 108, may render one or more user interface objects to the consumer 110. Such one or more user interface objects may correspond to one or more pre-published container images or features associated therewith. In an embodiment, the one or more user interface objects may be generated based on JSON. A person of ordinary skill in the art will appreciate that the generation of the one or more user interface objects may be based on various other object notations know in the art, without limiting the scope of the disclosure. In scenarios when the received request does not include the specific details of the one or more container images and/or one or more features that the consumer 110 intends to use from the one or more container images, such information may be extracted by the container image accessing system 102 as one or more inputs, by use of the aforesaid user interface objects, rendered on the user interface 108.

In an embodiment, the container image accessing system 102 may determine whether the one or more requested container images require to be generated based on a customization performed on one or more container images pre-published in the container image repository 104. The one or more pre-published container images are updated in the one or more nodes, based on at least public keys of publishers of the one or more pre-published container images, one or more smart contracts, and one or more certificates associated with the publisher.

In an embodiment, when it is determined that the requested one or more container images correspond to pre-published container images, the container image accessing system 102 may retrieve the one or more container images from the container image repository 104 and make the package of one or more container images available for use. Further, basis the successful retrieval, the container image accessing system 102 may generate one or more notifications for the consumer 110 and render them on the user interface 108.

In scenarios, when it is determined that the one or more requested container images require to be generated based on a customization performed on one or more container images pre-published in the container image repository 104, the container image accessing system 102 may identify, corresponding to the extracted one or more features, a set of pre-published container images from the one or more pre-published container images and associated metadata from respective nodes of the distributed ledger network 106. In an embodiment, the metadata includes, but is not limited to, a list of changes made to a container image, a compilation time of a container image, one or more dependencies associated with a container image, a code generated corresponding to addition of a container image to a node of the distributed ledger network.

Based on the identification, the container image accessing system 102 may generate the customized one or more container images corresponding to the access request, based on reconciliation of the metadata of the identified set of pre-published container images. In an embodiment, the reconciliation includes determining whether one or more conflicts exist in the metadata of the identified set of pre-published container images. In scenarios, when it is determined that is an absence of any conflict in the metadata, the container image accessing system 102 may determine one or more instructions for merging the identified set of pre-published container images to generate customized one or more container images. In scenarios, when a conflict is determined, the container image accessing system 102 may generate error notification to be presented to the consumer 110 by use of the user interface 108.

Figure 2:
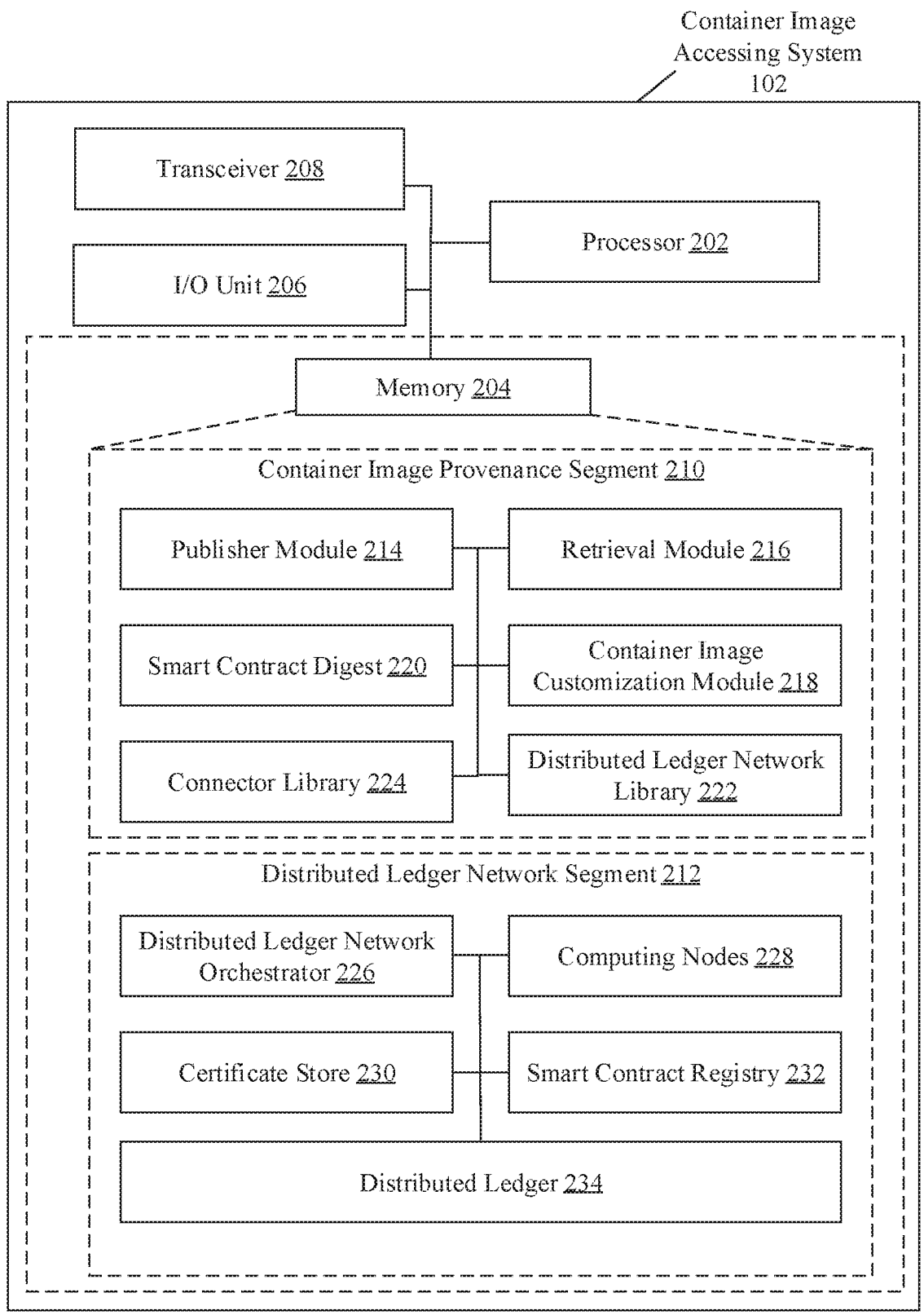
FIG. 2 is a block diagram of exemplary system for accessing one or more container images in a distributed ledger network environment, in accordance with some embodiments of the present disclosure.

FIG. 2 is a block diagram of exemplary system for accessing one or more container images in a distributed ledger network environment, in accordance with some embodiments of the present disclosure. FIG. 2 is explained in conjunction with elements from FIG. 1. With reference to FIG. 2, there is shown the container image accessing system 102. The container image accessing system 102 may include one or more processors, such as a processor 202, a memory 204, an input/output unit 206, and a transceiver 208. The memory 204 may include one or more segments, such as, a container image provenance segment 210 and a distributed ledger network management segment 212.

The processor 202 may include suitable logic, circuitry, interfaces, and/or code that may be configured to execute a set of instructions stored in the memory 204. The processor 202 may be configured to receive and process one or more requests from publishers for publishing one or more container images in a container image repository 104. Based on the one or more requests received from the publishers, the processor may be configured to update and publish the one or more container images to the container image repository 104 after performing verification by leveraging distributed ledger network features integrated with the container image accessing system 102. The processor 202 may be further configured to receive and process one or more requests from consumers for accessing one or more container images. Based on the received one or more requests, the processor 202 may dynamically retrieve or customize pre-published container images based on the requirements of the consumers. Examples of the processor 202 may be an X86-based processor, a Reduced Instruction Set Computing (RISC) processor, an Application-Specific Integrated Circuit (ASIC) processor, a Complex Instruction Set Computing (CISC) processor, and/or other processors.

The memory 204 may include suitable logic, circuitry, and/or interfaces that may be configured to store a machine code and/or a computer program with at least one code section executable by the processor 202. In an embodiment, the memory 204 may include a plurality of segments discussed above. Each of the plurality of segments may further include one or more modules for performing functions relating to publishing or retrieval of one or more container images from the container image repository 104. In an implementation, the container image provenance segment 210 may include one or more modules such as, a publisher module 214, a retrieval module 216, a container image customization module 218, a smart contract digest 220, a connector library 222, and a distributed ledger network library 224.

In an implementation, the publisher module 214 may include suitable logic, circuitry, and/or interfaces that may be configured to manage the interactions with a user who intends to publish or modify the container images. The publisher module 214 may be further configure to manage the user authentication for publishing of the container images into the container image repository 104.

In an implementation, the retrieval module 216 may include suitable logic, circuitry, and/or interfaces that may be configured to manage the interactions with a user who intends to access the container images. The retrieval module 216 may be further configure to manage the user authentication for retrieval of the container images from the container image repository 104.

In an implementation, the container image customization module 218 may include suitable logic, circuitry, and/or interfaces that may be configured to manage the interactions with retrieval module 216 for analyzing the features requested in the customized container image. The container image customization module 218 may be further configured to verify the feasibility of providing an appropriate custom verified container image.

In an implementation, the smart contract digest 220 may include suitable logic, circuitry, and/or interfaces that may be configured to manage the interactions with the publisher module 214 and the retrieval module 216. The smart contract digest 220 may be responsible for providing the image version, image dependency details, image provenance digest details. The smart contract digest 220 contains container image manifests of individual changes made by various version of each container image.

In an implementation, the distributed ledger network library 224 may include suitable logic, circuitry, and/or interfaces that may be configured to receive a serialized data stream from connector library 222, which can be authenticated and authorized as part of distributed ledger network. This distributed ledger network library 224 may be further configured to return a digest of container image content in an output stream to connector library 222, subsequent to successful registration of transaction in distributed ledger 234.

In an implementation, the distributed ledger network management segment 212 may include one or more modules such as, distributed ledger network orchestrator 226, one or more computing nodes 228, a certificate store 230, a smart contract registry 232, and a distributed ledger 234.

A person of ordinary skill in the art will appreciate that in an implementation, the aforementioned segments and/or modules of the memory 204 may be implemented based on software based modules. In another implementation, the aforementioned segments and/or modules may be implemented based on dedicated hardware modules that comprises a portion of an integrated circuit that also performs other functions. Examples of implementation of the memory 204 may include, but are not limited to, Random Access Memory (RAM), Read Only Memory (ROM), Hard Disk Drive (HDD), and/or a Secure Digital (SD) card.

The I/O unit 206 may include suitable logic, circuitry, interfaces, and/or code that may be configured to receive one or more credentials from the consumers and the publishers. The I/O unit 206 may be further configured to provide an interface to the consumers for provided one or more inputs corresponding to features that the consumers desire in the one or more container images. Additionally, I/O unit 206 may further include one or more interfaces for notifying the result of customizing the one or more container images to the consumer. In an implementation, the I/O unit 206 may include a display (not shown) as one or more interfaces for the publishers and the consumers. Examples of the display screen have been disclosed in FIG. 1. A person of ordinary skill in the art will appreciate that the I/O unit may further include one or more audio based output devices for enabling communication with the publishers and/or the consumers.

The transceiver 208 may include suitable logic, circuitry, interfaces, and/or code that may be configured to communicate with another container image repository 104, the consumer 110, and/or the publisher 112, via the communication network 114. The transceiver 208 may implement known technologies to support wired or wireless communication. The transceiver 208 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer. The transceiver 208 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as Global System for Mobile Communications (GSM), Enhanced Data GSM Environment (EDGE), wideband code division multiple access (W-CDMA), code division multiple access (CDMA), Long Term Evolution (LTE), time division multiple access (TDMA), Bluetooth, Wireless Fidelity (Wi-Fi) (such as IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS).

In operation, the processor 202 may be configured to register one or more users that may intend to access or publish container images from the container image repository 104. The registration may be based on one or more credentials provided by the users to the processor 202, via the I/O unit 206. In an embodiment, the registered user may correspond to the consumer 110, in which case, the access request received from the user may correspond to a request for accessing features (or a combination of features) of one or more container images pre-published in the container image repository 104. In an embodiment, the registered user may correspond to the publisher 112, in which case, the access request received from the user may correspond to a request for modifying one or more container images pre-published in the container image repository 104 or creating one or more container images to be published in the container image repository 104. In an embodiment, the credentials used by the users for registration may be stored in the memory 204 for future verification of the identities of the users.

In an embodiment, the requests received from the consumer 110 or the publisher 112 may further include metadata associated with the one or more container images that is intended to be accessed or published, respectively. In an embodiment, the metadata may include, but is not limited to, names of the one or more container images, locations on a local file system where the one or more container images have been generated, one or more tags with which the publisher intends to associate the one or more container images, a list of features associated with the one or more container images, a list of modified features associated with the one or more container images, a date of creation or modification of each container image from the one or more container images, and one or more dependencies associated with the one or more container images.

In an embodiment, the processor 202 in conjunction with the I/O unit 206 may render one or more user interface objects on the user interface 108. Using the one or more user interface objects, the publisher 112 may provide a request for accessing one or more container images. Upon receipt of such request, the processor 202 may be configured to verify the identity of the publisher 112 based on one or more credentials received from the publisher 112 and the corresponding authentication details stored in the memory 204. The container image accessing system 102 may further verify the metadata associated with the one or more container images.

Upon successful verification of the identity of the publisher 112 and the metadata associated with the one or more container images, the processor 202 may categorize the request received from the publisher 112 into a request for creating a new container image, a request for creating a new container image, a request for fixing an issue in one or more container pre-published container images, a request for enhancing one or more pre-published container images with one or more features, a request for deleting one or more pre-published container images. In an embodiment, upon publishing or modification, the processor 202 may be configured to capture the related dependencies required to fulfill the respective change. These details may be received as part of JSON object using the I/O unit 206, while invoking restful application programming interfaces (API's).

Post the categorization, when it is determined by the processor 202 that the request corresponds to a request for creating a new container image, the processor 202, in conjunction with the publisher module 214, may be configured to authenticate based on the one or more credentials. At this stage, the processor 202 may be configured to receive user credentials from the publisher 112 and invokes the publisher module 214 while sharing the pre-registered credentials to authenticate against the container image repository 104 to enable access to the container image repository 104. The invocations happen as restful API's over network.

Thereafter, the processor 202, in conjunction with the distributed ledger network library 224, the certificate store 230, and the smart contract registry 232, may be configured to generate verified container image data that includes, but is not limited to, a distributed ledger transaction identification (ID), public certificate details, version of the container image at the time of transaction related to the distributed ledger 234, a dependency list associated with the container image, one or more features included in the container image.

In an embodiment, the processor 202, in conjunction with the connector library 222, may be configured to read the verified container image as byte input stream of data. Subsequently, the processor 202, in conjunction with the connector library 222, may be configured to serialize the verified container image into a format compatible to perform write operations in the distributed ledger 234. The processor 202, in conjunction with the certificate store 230, and the smart contract registry 232, and the distributed ledger network orchestrator 226, may be configured to update the serialized container image in one or more computing nodes 228 and make corresponding updates to the distributed ledger 234. The aforesaid updates may be based on at least a public key of the publisher 112, one or more smart contracts, and one or more certificates associated with the publisher 112. Subsequently, the processor 202, in conjunction with the transceiver 208, may be configured to publish the one or more container images in the container image repository 104 by converting the updated container image into a serializable container image. The published one or more container images may be accessed by one or more consumers (such as the consumer 110), based on a request received from the one or more consumers for accessing the published one or more container images.

Post the categorization, when it is determined that the request corresponds to a request for fixing an issue in one or more container pre-published container images, a request for enhancing one or more pre-published container images with one or more features, a request for deleting one or more pre-published container images, the one or more container images are streamed as byte input based on verification of metadata of each container image from the one or more container images.

In an embodiment, the verification may be performed by the processor 202, in conjunction with the smart contract digest 220. The verification includes reconciling the metadata (discussed above) of each container image from the one or more container images and the corresponding container images stored in the container image repository 104, based on an invocation of a smart contract digest 220.

As discussed above, the streaming of the one or more container image is performed by the processor 202, in conjunction with the connector library 222. In an embodiment, the serialization may be performed using libraries that include, but are not limited to, github.com/coreos/clair/API/v3, github.com/coreos/clair/database, github.com/coreos/clair/pkg/fsutil, crypto/tls, github.com/grpc-ecosystem/go-grpc-prometheus, google.golang.org/grpc, google.golang.org/grpc/credentials, github.com/deckarep/golang-set, "archive/tar", "bufio", "bytes", "compress/bzip2", "compress/gzip", "errors", "io", "io/ioutil", "os/exec". These libraries are used to parse the one or more container images and extract the content and convert the same into a format compatible for updation in the distributed ledger 234 and the computing nodes 228.

Thereafter, the processor 202, in conjunction with the certificate store 230, and the smart contract registry 232, and the distributed ledger network orchestrator 226, may be configured to convert the serialized data stream into an image-digest. The processor 202, in conjunction with the smart contract digest 220, may be configured to sign the image digest using the public key of the publisher 112, one or more smart contracts, and one or more certificates associated with the publisher 112. Further, the processor 202 may be configured to convert the signed image digest as a stream of output data that is streamed to the distributed ledger network orchestrator 226.

The processor 202, in conjunction with the distributed ledger network orchestrator 226, may be configured to identify the stream of the converted signed image digest container image as asset, publisher 112 and consumer 110 as participants and identifies respective smart contract policies and certificates for the publisher 112 from the certificate store 230 and the smart contract registry 232. The processor 202, in conjunction with the distributed ledger network orchestrator 226, may be further configured to identify one or more participating nodes from the computing nodes 228. The identified one or more nodes may be tasked with the responsibility of updating the stream of the converted signed image digest container image in the distributed ledger 234. To this end, the identified one or more nodes may load the corresponding certificates from the certificate store 230, loads the smart contract policies defined against the respective user from the smart contract registry 232, and execute the transaction for public reference. Post-successful update into the distributed ledger 234, the details may be returned as business network archive to distributed ledger network orchestrator 226.

In response to the update, the processor 202, in conjunction with the connector library 222, may be configured to extract the business network archive in the form of an input stream, and subsequently convert the data into serializable format using custom build go libraries. Thereafter, the processor 202, in conjunction with the connector library 222, may be configured to propagates the de-serialized container image to the publisher module 214, which may invoke the container image repository APIs to upload the image into the container image repository 104.

For a request received from the consumer 110, via one or more JSON objects presented to the consumer 110 in the user interface 108, the processor 202 may be configured to verify the identity of the consumer 110 based on one or more credentials received from the consumer 110. In an implementation, the processor 202, in conjunction with the I/O unit 206, may be configured to present one or more options to the consumer 110 for subscribing access to certain premium container images that may be pre-published in the container image repository 104. This may require the consumer 110 to make periodic payments towards receiving access to the container images along with download rights to certain premium versions/specific container images, or even optionally for access to the container image accessing system 102. Such subscription models can even apply to container images that fulfill specific premium features, which the publisher (such as the publisher 112) can mark as such. Under this model, the consumer may be required to complete enrollment with necessary personal details as described earlier, to receive access as "consumers" of the container images.

In an embodiment, the received request may include specific details of the one or more container images and/or one or more features that the consumer 110 intends to use from the one or more container images. In an embodiment, the processor 202, in conjunction with the container image repository 104 and the I/O unit 206, may be configured to render one or more user interface objects to the consumer 110. Such one or more user interface objects may correspond to one or more pre-published container images or features associated therewith. Further, in an embodiment, the rendered one or more container images and/or one or more features may be based on filtering performed on the access rights of the consumer 110. In an embodiment, the one or more user interface objects may be generated based on JSON.

A person of ordinary skill in the art will appreciate that the generation of the one or more user interface objects may be based on various other object notations know in the art, without limiting the scope of the disclosure. In scenarios when the received request does not include the specific details of the one or more container images and/or one or more features that the consumer 110 intends to use from the one or more container images, such information may be extracted by the container image accessing system 102 as one or more inputs, by use of the aforesaid user interface objects, rendered on the user interface 108. For example, navigation by the consumer 110 to a certain specific web page may be an indication of an intent of the consumer 110 to download container images having certain specific features.

In an embodiment, the processor 202 may be configured to extract the features for all container images pre-published in the container image repository 104 and present to the consumer 110 as a list of available features. Although, the list may be presented as a single list to the consumer 110, it may stem from different individual verified publisher-submitted container images. The processor 202 may be configured to enable the consumer 110 to exercise a step of indicating preference for inclusion of each such feature into a new custom-built verified container image. Additionally, some of such features may come as default in the choice menu. For example, if the consumer 110 selects feature 'X'; and feature 'X' is part of a verified container image 11', then all other features of 'I1', say 'Y' and 'Z' will be selected automatically, by default, and the consumer 110 will not have the option to unselect/deselect such auto-selected feature set. However, if the consumer intends to remove features 'Y' and 'Z' from the customized container image, the consumer 110 may have to remove feature 'X'. The present disclosure overcomes this by configuring the processor 202 to prepare feature list bundles based on the feature listing for each verified container image. Further, based on the base container image selected by the consumer 110, feature list bundles, that belong to eligible verified container images (built on the consumer selected base image) are displayed to the consumer 110 by the processor 202 using the I/O unit 206. The processor 202 then presents relevant options to the consumer 110 to select entire feature bundles, while allowing combination among different feature bundles.

Based on the aforementioned, the processor 202 may be configured to determine whether the one or more requested container images require to be generated based on a customization performed on one or more container images pre-published in the container image repository 104. The one or more pre-published container images may correspond to the one or more container images updated in the one or more nodes of the distributed ledger 234, based on at least public keys of publishers of the one or more pre-published container images, one or more smart contracts, and one or more certificates associated with the publisher.

In an embodiment, when it is determined that the requested one or more container images correspond to pre-published container images, the processor 202 may be configured to retrieve the one or more container images from the container image repository 104 and make the package of one or more container images available for use. Further, the processor 202 may be configured to verify the metadata of the retrieved one or more container images corresponding entries in the smart contract digest 220. Basis the successful retrieval, the processor 202 may be configured to generate one or more notifications for the consumer 110 and render them on the user interface 108 via the I/O unit 206.

In scenarios, when it is determined that the one or more requested container images require to be generated based on a customization performed on one or more container images pre-published in the container image repository 104, the processor 202 may be configured to invoke the container image customization module 218. The container image customization module 218 may be configured to identify, corresponding to the extracted one or more features, a set of pre-published container images from the one or more pre-published container images and associated metadata from the distributed ledger 234. In an embodiment, the metadata includes, but is not limited to, a list of changes made to a container image, a compilation time of a container image, one or more dependencies associated with a container image, a code generated corresponding to addition of a container image to a node of the distributed ledger network.

Responsive to the determination for generating the customized one or more container images, the processor 202, in conjunction with the container image customization module 218, may be configured to retrieve one or more verified container images from the container image repository 104. The retrieval may be based on a correlation between the features selected by the consumer 110. Based on the identification, the container image accessing system 102 may generate the customized one or more container images corresponding to the access request, based on reconciliation of the metadata of the identified set of pre-published container images. In an embodiment, the reconciliation includes determining whether one or more conflicts exist in the metadata of the identified set of pre-published container images.

To this end, the processor 202 may be configured to identify the change lists associated with the retrieved one or more verified container images, based on the entries fetched from the smart contract digest 220. At compilation time of the container images, each change may have been added as a ledger entry in the distributed ledger 234, in order to allow for a unique listing of code changes with respect to functional modules of the container image. Further, the dependencies may have been recorded along with the change lists.

As an example, a modified container image, during initial submission by the publisher (say publisher 112) with respect to a base container image, may undergo a change comparison with the base image for identifying code/function modifications. The publisher 112 may have additionally provided an option to explicitly define such functional modifications and may have declared relevant dependencies. Each such declared/defined change may have been recorded as a separate entry in the distributed ledger 234. As a part of the container image metadata, it is these entries that may be received as change lists by the container image customization module 218, along with the downloaded container image from container image repository 104. In an embodiment, the processor 202 may be configured to validate and/or authenticate such entries by comparison with corresponding entries in the smart contract digest 220

In scenarios, when it is determined that is an absence of any conflict in the metadata, the processor 202 may be configured to determine one or more instructions for merging the identified set of pre-published container images to generate customized one or more container images. Further, the processor 202 may be configured to notify the consumer 110 about the availability of the customized one or more container images for download, using the I/O unit 206.

In certain other scenarios, when a conflict is determined, the container image accessing system 102 may generate error notification to be presented to the consumer 110 by use of the I/O unit, via user interface 108.

Figure 3:
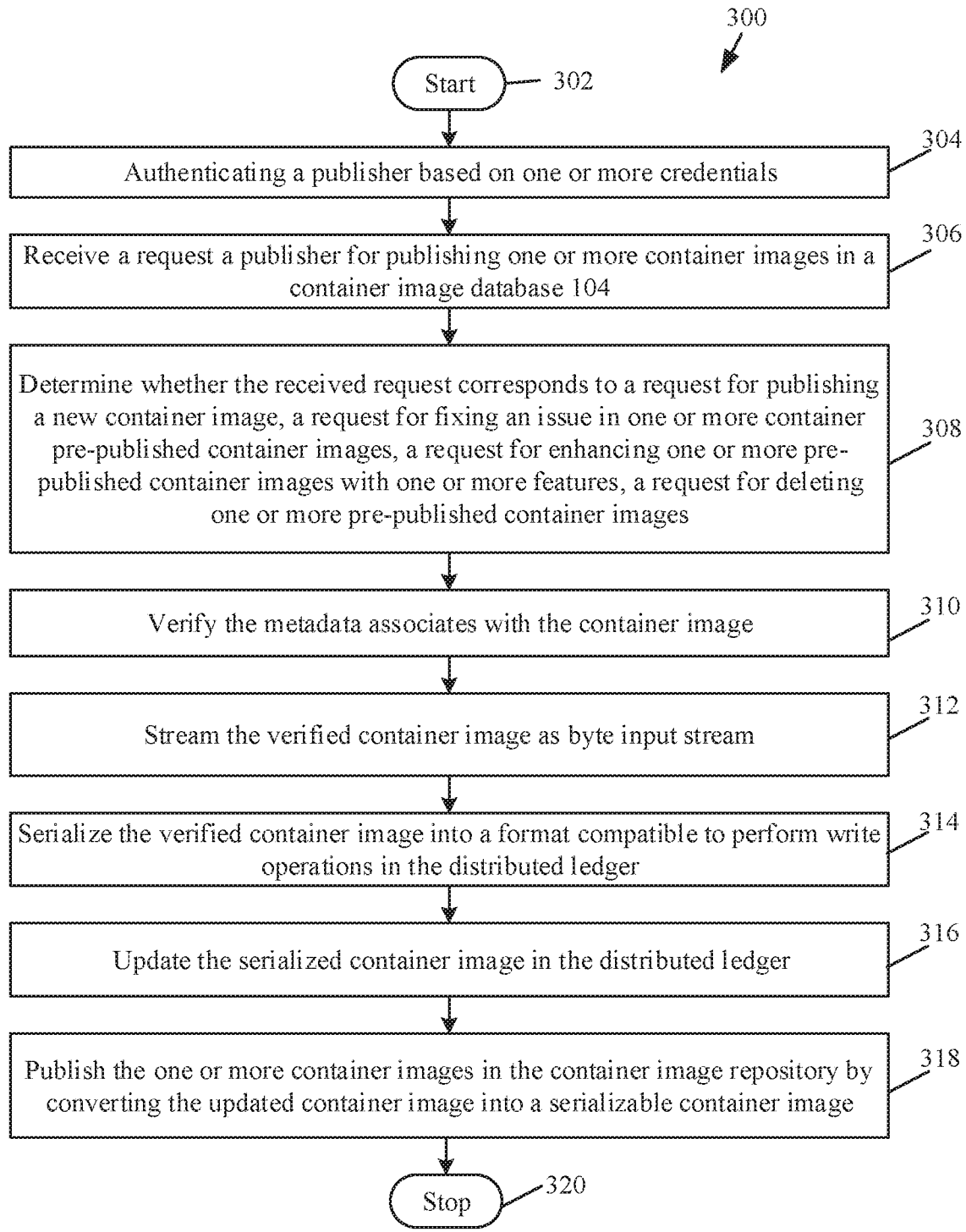
FIG. 3 is a flow diagram of a detailed exemplary process for publishing of one or more container images by a publisher in a distributed ledger network environment, in accordance with some embodiments of the present disclosure.

FIG. 3 is a flow diagram of a detailed exemplary process for publishing of one or more container images by a publisher in a distributed ledger network environment, in accordance with some embodiments of the present disclosure. With reference to FIG. 3, there is shown a flow chart 300. The flow chart 300 is described in conjunction with FIGS. 1 and 2. The process starts at step 302 and proceeds to step 304.

At step 304, authenticating a publisher 112 based on one or more credentials. At step 306, a request may be received from a publisher 112, by the container image accessing system 102, for publishing one or more container images in a container image repository 104. At step 308, it may be determined whether the received request corresponds to a request for publishing a new container image, a request for fixing an issue in one or more container pre-published container images, a request for enhancing one or more pre-published container images with one or more features, a request for deleting one or more pre-published container images.

At step 310, the metadata associated with the container image may be verified. At step 312, the verified container image may be streamed as byte input stream. At step 314, the verified container image may be serialized into a format compatible to perform write operations in the distributed ledger 234. At step 316, the serialized container image may be updated in one or more computing nodes 228 and the distributed ledger 234. The aforesaid updates may be based on at least a public key of the publisher 112, one or more smart contracts, and one or more certificates associated with the publisher 112. At step 318, the one or more container images may be published in the container image repository 104 by converting the updated container image into a serializable container image. The published one or more container images may be accessed by one or more consumers (such as the consumer 110), based on a request received from the one or more consumers for accessing the published one or more container images. The control passes to end step 320.

Figure 4A:
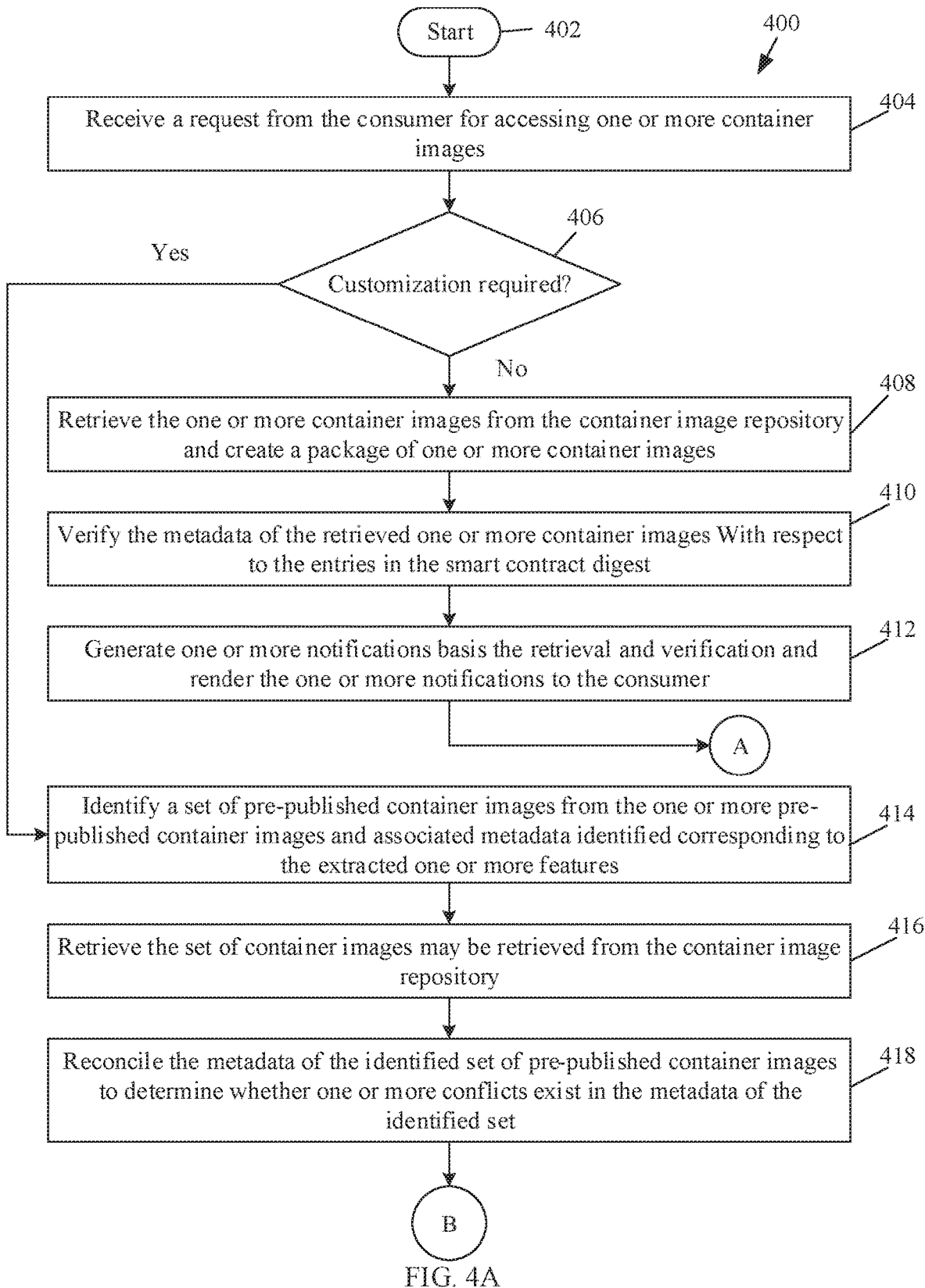
FIGS. 4A and 4B collectively illustrate a flow diagram of a detailed exemplary process for facilitating access of one or more container images by a consumer in a distributed ledger network environment, in accordance with some embodiments of the present disclosure.
Figure 4B:
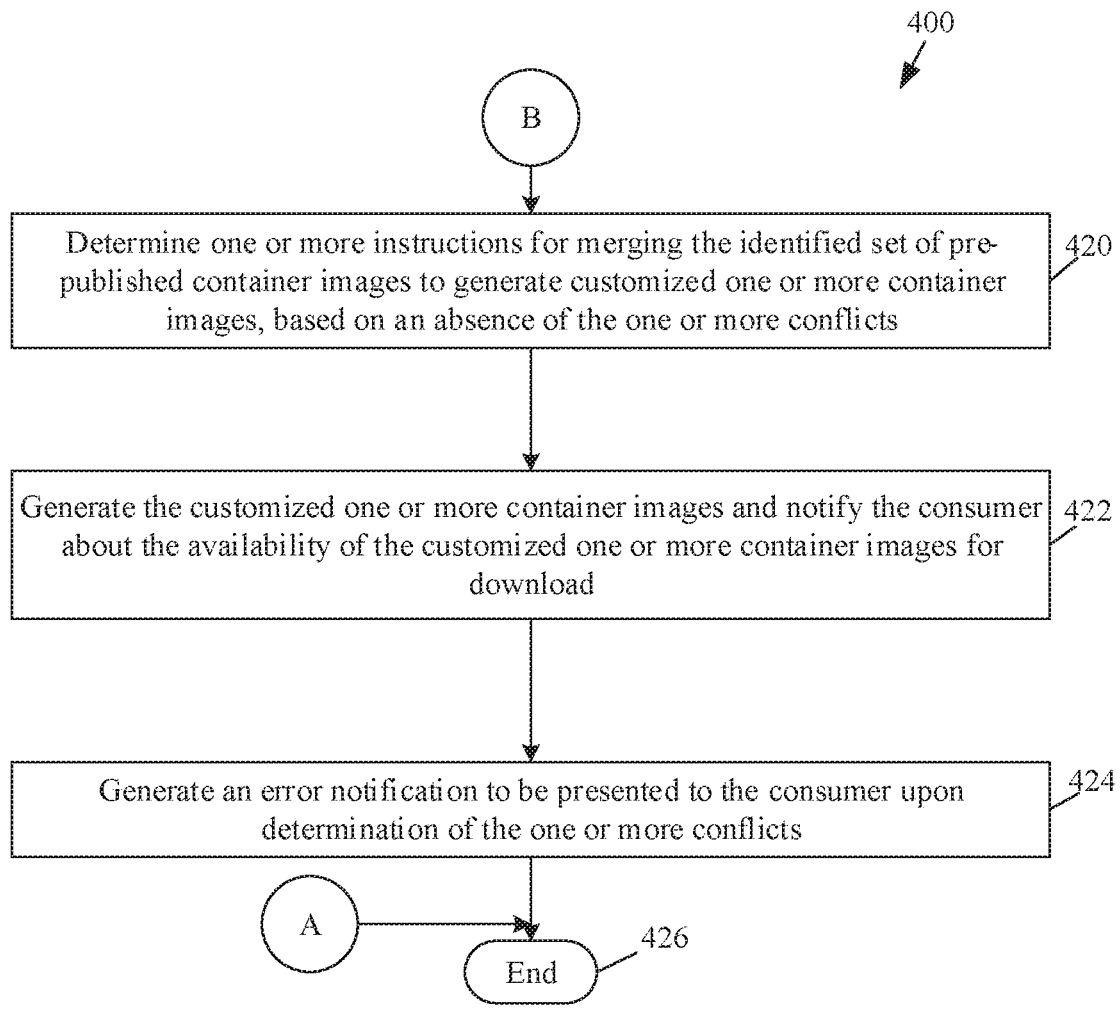

FIGS. 4A and 4B collectively illustrate a flow diagram of a detailed exemplary process for accessing of one or more container images by a consumer in a distributed ledger network environment, in accordance with some embodiments of the present disclosure. With reference to FIGS. 4A and 4B, there is shown a flow chart 400. The flow chart 400 is described in conjunction with FIGS. 1 and 2. The process starts at step 402 and proceeds to step 404.

At step 404, a request may be received from the consumer 110 for accessing one or more container images in the container image repository 104. The received request may include specific details of the one or more container images and/or one or more features that the consumer 110 intends to use from the one or more container images. At step 406, it may be determined whether the one or more requested container images require to be generated based on a customization performed on one or more container images pre-published in the container image repository 104. In scenarios, when the one or more requested container images can be generated without performing any customization on one or more container images pre-published in the container image repository 104, the control passes to step 408. In scenarios, when the one or more requested container images require to be generated based on a customization performed on one or more container images pre-published in the container image repository 104, the control passes to step 414.

At step 408, the one or more container images may be retrieved from the container image repository 104 and a package of one or more container images may be created and made available for use. At step 410, the metadata of the retrieved one or more container images may be verified corresponding entries in the smart contract digest 220. At step 412, basis the retrieval and verification one or more notifications may be generated and rendered to the consumer 110 on the user interface 108. The control passes to end step 426.

At step 414, corresponding to the extracted one or more features, a set of pre-published container images from the one or more pre-published container images and associated metadata may be identified from the distributed ledger 234. At step 416, the set of container images may be retrieved from the container image repository 104. At step 418, the metadata of the identified set of pre-published container images may be reconciled to determine whether one or more conflicts exist in the metadata of the identified set. At step 420, one or more instructions for merging the identified set of pre-published container images to generate customized one or more container images, based on an absence of the one or more conflicts. At step 422, the customized one or more container images may be generated and the consumer 110 may be notified about the availability of the customized one or more container images for download. The control passes to end step 426.

At step 424, an error notification to be presented to the consumer 110 may be generated upon determination of the one or more conflicts. The control passes to end step 426.

As will be also appreciated, the above described techniques may take the form of computer or controller implemented processes and apparatuses for practicing those processes. The disclosure can also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 5:
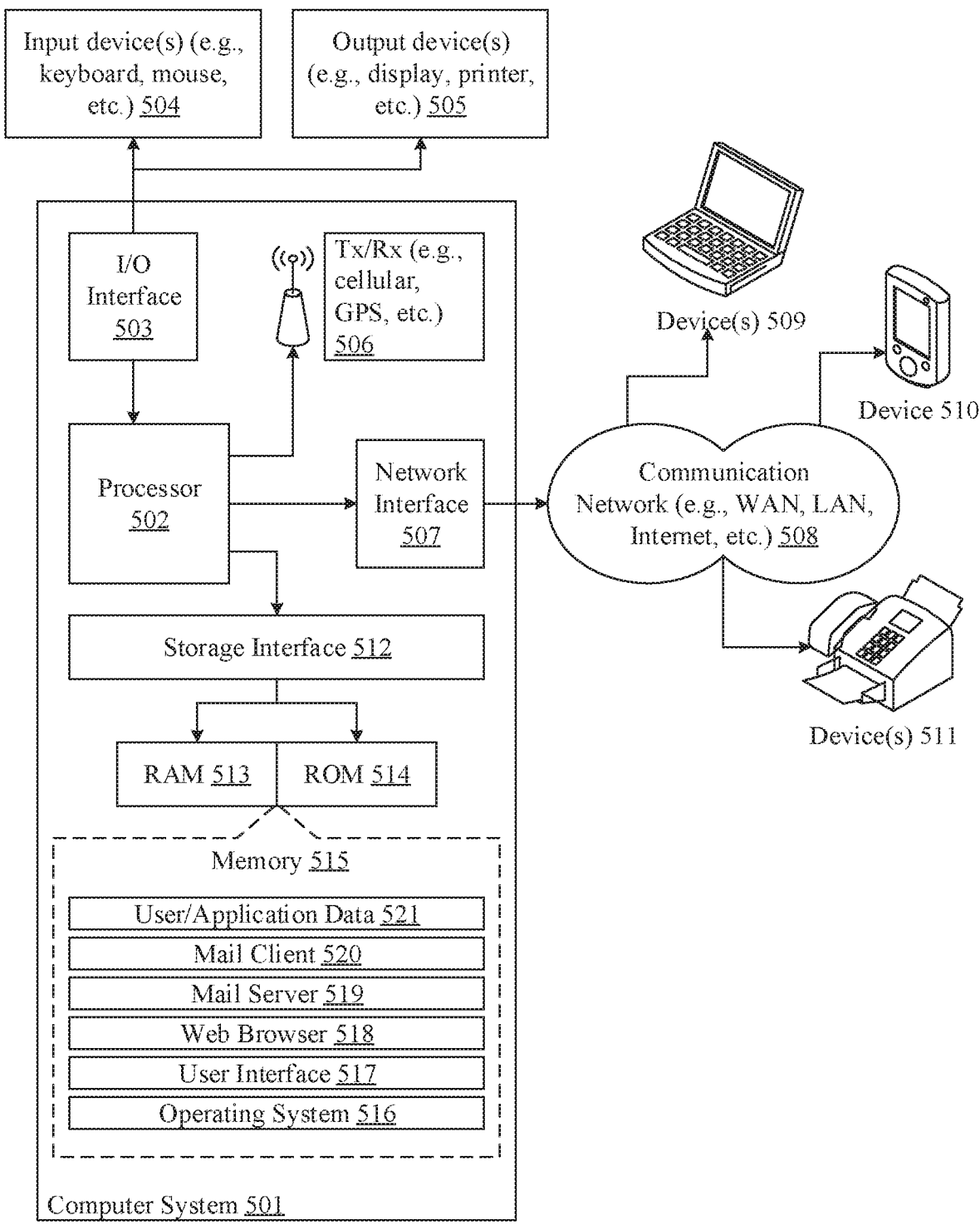
FIG. 5 is a block diagram of an exemplary computer system for implementing embodiments consistent with the present disclosure.

Referring now to FIG. 5, a block diagram of an exemplary computer system 502 for implementing various embodiments is illustrated. Computer system 502 may include a central processing unit ("CPU" or "processor") 504. Processor 504 may include at least one data processor for executing program components for executing user or system-generated requests. A user may include a person, a person using a device such as such as those included in this disclosure, or such a device itself. Processor 504 may include specialized processing units such as integrated system (bus) controllers, memory management control units, floating point units, graphics processing units, digital signal processing units, etc. Processor 504 may include a microprocessor, such as AMD® ATHLON® microprocessor, DURON® microprocessor OR OPTERON® microprocessor, ARM's application, embedded or secure processors, IBM® POWERPC®, INTEL'S CORE® processor, ITANIUM® processor, XEON® processor, CELERON® processor or other line of processors, etc. Processor 504 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 504 may be disposed in communication with one or more input/output (I/O) devices via an I/O interface 506. I/O interface 506 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (for example, code-division multiple access (CDMA), high-speed packet access (HSPA+), global system for mobile communications (GSM), long-term evolution (LTE), WiMax, or the like), etc.

Using I/O interface 506, computer system 502 may communicate with one or more I/O devices. For example, an input device 508 may be an antenna, keyboard, mouse, joystick, (infrared) remote control, camera, card reader, fax machine, dongle, biometric reader, microphone, touch screen, touchpad, trackball, sensor (for example, accelerometer, light sensor, GPS, gyroscope, proximity sensor, or the like), stylus, scanner, storage device, transceiver, video device/source, visors, etc. An output device 510 may be a printer, fax machine, video display (for example, cathode ray tube (CRT), liquid crystal display (LCD), light-emitting diode (LED), plasma, or the like), audio speaker, etc. In some embodiments, a transceiver 512 may be disposed in connection with processor 514. Transceiver 512 may facilitate various types of wireless transmission or reception. For example, transceiver 512 may include an antenna operatively connected to a transceiver chip (for example, TEXAS® INSTRUMENTS WILINK WL1286® transceiver, BROADCOM® BCM4550IUB8® transceiver, INFINEON TECHNOLOGIES® X-GOLD 618-PMB9800® transceiver, or the like), providing IEEE 802.6a/b/g/n, Bluetooth, FM, global positioning system (GPS), 2G/3G HSDPA/HSUPA communications, etc.

In some embodiments, processor 504 may be disposed in communication with a communication network 514 via a network interface 516. Network interface 516 may communicate with communication network 514. Network interface 516 may employ connection protocols including, without limitation, direct connect, Ethernet (for example, twisted pair 50/500/5000 Base T), transmission control protocol/internet protocol (TCP/IP), token ring, IEEE 802.11a/b/g/n/x, etc. Communication network 514 may include, without limitation, a direct interconnection, local area network (LAN), wide area network (WAN), wireless network (for example, using Wireless Application Protocol), the Internet, etc. Using network interface 516 and communication network 514, computer system 502 may communicate with devices 518, 520, and 522. These devices may include, without limitation, personal computer(s), server(s), fax machines, printers, scanners, various mobile devices such as cellular telephones, smartphones (for example, APPLE® IPHONE® smartphone, BLACKBERRY® smartphone, ANDROID® based phones, etc.), tablet computers, eBook readers (AMAZON® KINDLE® ereader, NOOK® tablet computer, etc.), laptop computers, notebooks, gaming consoles (MICROSOFT® XBOX® gaming console, NINTENDO® DS® gaming console, SONY® PLAYSTATION® gaming console, etc.), or the like. In some embodiments, computer system 502 may itself embody one or more of these devices.

In some embodiments, processor 504 may be disposed in communication with one or more memory devices (for example, RAM 526, ROM 528, etc.) via a storage interface 524. Storage interface 524 may connect to memory 530 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Memory 530 may store a collection of program or database components, including, without limitation, an operating system 532, user interface application 534, web browser 536, mail server 538, mail client 540, user/application data 542 (for example, any data variables or data records discussed in this disclosure), etc. Operating system 532 may facilitate resource management and operation of computer system 502. Examples of operating systems 532 include, without limitation, APPLE® MACINTOSH® OS X platform, UNIX platform, Unix-like system distributions (for example, Berkeley Software Distribution (BSD), FreeBSD, NetBSD, OpenBSD, etc.), LINUX distributions (for example, RED HAT®, UBUNTU®, KUBUNTU®, etc.), IBM® OS/2 platform, MICROSOFT® WINDOWS® platform (XP, Vista/7/8, etc.), APPLE® IOS® platform, GOOGLE® ANDROID® platform, BLACKBERRY® OS platform, or the like. User interface 534 may facilitate display, execution, interaction, manipulation, or operation of program components through textual or graphical facilities. For example, user interfaces may provide computer interaction interface elements on a display system operatively connected to computer system 502, such as cursors, icons, check boxes, menus, scrollers, windows, widgets, etc. Graphical user interfaces (GUIs) may be employed, including, without limitation, APPLE® Macintosh® operating systems' AQUA® platform, IBM® OS/2® platform, MICROSOFT® WINDOWS® platform (for example, AERO® platform, METRO® platform, etc.), UNIX X-WINDOWS, web interface libraries (for example, ACTIVEX® platform, JAVA® programming language, JAVASCRIPT® programming language, AJAX® programming language, HTML, ADOBE® FLASH® platform, etc.), or the like.

In some embodiments, computer system 502 may implement a web browser 536 stored program component. Web browser 536 may be a hypertext viewing application, such as MICROSOFT® INTERNET EXPLORER® web browser, GOOGLE® CHROME® web browser, MOZILLA® FIREFOX® web browser, APPLE® SAFARI® web browser, etc. Secure web browsing may be provided using HTTPS (secure hypertext transport protocol), secure sockets layer (SSL), Transport Layer Security (TLS), etc. Web browsers may utilize facilities such as AJAX, DHTML, ADOBE® FLASH® platform, JAVASCRIPT® programming language, JAVA® programming language, application programming interfaces (APIs), etc. In some embodiments, computer system 502 may implement a mail server 538 stored program component. Mail server 538 may be an Internet mail server such as MICROSOFT® EXCHANGE® mail server, or the like. Mail server 538 may utilize facilities such as ASP, ActiveX, ANSI C++/C #, MICROSOFT .NET® programming language, CGI scripts, JAVA® programming language, JAVASCRIPT® programming language, PERL® programming language, PHP® programming language, PYTHON® programming language, WebObjects, etc. Mail server 538 may utilize communication protocols such as internet message access protocol (IMAP), messaging application programming interface (MAPI), Microsoft Exchange, post office protocol (POP), simple mail transfer protocol (SMTP), or the like. In some embodiments, computer system 502 may implement a mail client 540 stored program component. Mail client 540 may be a mail viewing application, such as APPLE MAIL® client, MICROSOFT ENTOURAGE® mail client, MICROSOFT OUTLOOK® mail client, MOZILLA THUNDERBIRD® mail client, etc.

In some embodiments, computer system 502 may store user/application data 542, such as the data, variables, records, etc. as described in this disclosure. Such databases may be implemented as fault-tolerant, relational, scalable, secure databases such as ORACLE® database OR SYBASE® database. Alternatively, such databases may be implemented using standardized data structures, such as an array, hash, linked list, struct, structured text file (for example, XML), table, or as object-oriented databases (for example, using OBJECTSTORE® object database, POET® object database, ZOPE® object database, etc.). Such databases may be consolidated or distributed, sometimes among the various computer systems discussed above in this disclosure. It is to be understood that the structure and operation of the any computer or database component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

As will be appreciated by those skilled in the art, the techniques described in the various embodiments discussed above provide for accessing container images in a distributed ledger network environment, thereby enabling provisioning of container images using distributed ledger network for added security. The technique further provides an image provenance mechanism where publishers can upload their container images and their images are subsequently verified using distributed ledger network for added security by converting the image stream into a distributed ledger network stream so that consumers that download said images without the use of a separate Public Key Infrastructure (PKI) framework. The technique, while not utilizing PKI framework, still provide a standard certification authority for image provenance.

The aforementioned techniques further enable consumers to download pre-verified container images from a platform while ensuring audit trail, version control, feature tracking across versions and authenticity through image-metadata based validation. The techniques further provide consumers certain aspects of customizability by enabling merging of features across container images having different versions to suit the feature requirements of the consumer. The techniques further provide a provision of verifying the authenticity of the publisher themselves. The techniques further provide a scope for a consumer to customize the container images, by merging different versions of images to suit the consumer's feature requirements.

The specification has described system and method for accessing container images in a distributed ledger network environment. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A system for accessing one or more container images in a distributed ledger network environment, the system comprising:
    a processor; and
    a memory communicatively coupled to the processor, wherein the memory stores the processor instructions, which, on execution, causes the processor to:
    receive a request from a consumer for accessing the one or more container images in a container image database;
    determine whether the one or more container images require to be generated based on a customization performed on one or more container images pre-published in the container image database, wherein the one or more pre-published container images are updated in one or more nodes of the distributed ledger network, based on at least public keys of publishers of the one or more pre-published container images, one or more smart contracts, and one or more certificates associated with the publishers;
    extract, based on the determined requirement, one or more features for performing the customization, based on one or more inputs received from the consumer;
    identify, corresponding to the extracted one or more features, a set of pre-published container images from the one or more pre-published container images and associated metadata from respective nodes of the distributed ledger network; and
    generate the customized one or more container images corresponding to the access request, based on reconciliation of the metadata of the identified set of pre-published container images.

2. The system of claim 1, wherein the metadata comprises: a list of changes made to a container image, a compilation time of a container image, one or more dependencies associated with a container image, a code generated corresponding to addition of a container image to a node of the distributed ledger network.

3. The system of claim 1, wherein the reconciliation comprises:
  determining whether one or more conflicts exist in the metadata of the identified set of pre-published container images;
  determining one or more instructions for merging the identified set of pre-published container images to generate customized one or more container images, based on an absence of the one or more conflicts; and
  generating error notification to be presented to the consumer, upon determination of the one or more conflicts.

4. The system of claim 1, wherein the processor is further configured to:
  receive a request from a publisher for publishing one or more container images in a container image database;
  serialize the one or more container images into a distributed ledger network compatible format;
  update the serialized container images in one or more nodes of the distributed ledger network, based on at least a public key of the publisher, one or more smart contracts, and one or more certificates associated with the publisher; and
  publish the serialized one or more container images in the container image database by converting the updated container image into a serializable container image, wherein the published one or more container images are accessed by one or more consumers based on a request received from the one or more consumers for accessing the published one or more container images.

5. The system of claim 4, wherein the processor is further configured to stream the one or more container images as byte input stream based on verification of metadata of each container image from the one or more container images.

6. The system of claim 5, wherein the streaming is performed when the request corresponds to a request for modifying one or more container images in the container image database.

7. The system of claim 4, wherein the verification comprises reconciling the metadata of each container image from the one or more container images and the corresponding container images stored in the container image database, based on an invocation of a smart contract digest from the one or more nodes of the distributed ledger network.

8. The system of claim 4, wherein the processor is further configured to authenticate respective identities of the consumer and the publisher, based on respective credentials provided by the consumer and the publisher.

9. The system of claim 4, wherein the request received from the publisher comprises: names of the one or more container images, locations on a local file system where the one or more container images have been generated, one or more tags with which the publisher intends to associate the one or more container images, a list of features associated with the one or more container images, a list of modified features associated with the one or more container images, a date of creation or modification of each container image from the one or more container images, and one or more dependencies associated with the one or more container images.

10. A method of accessing one or more container images in a distributed ledger network environment, the method comprising:
  receiving, by a container image accessing system, a request from a consumer for accessing the one or more container images in a container image database;
  determining, by the container image accessing system, whether the one or more container images require to be generated based on a customization performed on one or more container images pre-published in the container image database, wherein the one or more pre-published container images are updated in the one or more nodes of the distributed ledger network, based on at least public keys of publishers of the one or more pre-published container images, one or more smart contracts, and one or more certificates associated with the publishers;
  extracting, by the container image accessing system, based on the determined requirement, one or more features for performing the customization, based on one or more inputs received from the consumer;
  identifying, by the container image accessing system, corresponding to the extracted one or more features, a set of pre-published container images from the one or more pre-published container images and associated metadata from respective nodes of the distributed ledger network; and
  generating, by the container image accessing system, the customized one or more container images corresponding to the access request, based on reconciliation of the metadata of the identified set of pre-published container images.

11. The method of claim 10, wherein the metadata comprises: a list of changes made to a container image, a compilation time of a container image, one or more dependencies associated with a container image, a code generated corresponding to addition of a container image to a node of the distributed ledger network.

12. The method of claim 10, wherein the reconciliation comprises:
  determining whether one or more conflicts exist in the metadata of the identified set of pre-published container images;
  determining one or more instructions for merging the identified set of pre-published container images to generate customized one or more container images, based on an absence of the one or more conflicts; and
  generating error notification to be presented to the consumer, upon determination of the one or more conflicts.

13. The method of claim 10, further comprising:
  receiving a request from a publisher for publishing one or more container images in a container image database;
  serializing the one or more container images into a distributed ledger network compatible format;
  updating the serialized container image in one or more nodes of the distributed ledger network, based on at least a public key of the publisher, one or more smart contracts, and one or more certificates associated with the publisher; and
  publishing the serialized one or more container images in the container image database by converting the updated container image into a serializable container image, wherein the published one or more container images are accessed by one or more consumers based on a request received from the one or more consumers for accessing the published one or more container images.

14. The method of claim 13, further comprising streaming the one or more container images as byte input stream based on verification of metadata of each container image from the one or more container images.

15. The method of claim 14, wherein the streaming is performed when the request corresponds to a request for modifying one or more container images in the container image database.

16. The method of claim 13, wherein the verification comprises reconciling the metadata of each container image from the one or more container images and the corresponding container images stored in the container image database, based on an invocation of a smart contract digest from the one or more nodes of the distributed ledger network.

17. The method of claim 13, further comprising authenticating respective identities of the consumer and the publisher, based on respective credentials provided by the consumer and the publisher.

18. The method of claim 13, wherein the request received from the publisher comprises: names of the one or more container images, locations on a local file system where the one or more container images have been generated, one or more tags with which the publisher intends to associate the one or more container images, a list of features associated with the one or more container images, a list of modified features associated with the one or more container images, a date of creation or modification of each container image from the one or more container images, and one or more dependencies associated with the one or more container images.

19. A non-transitory computer-readable medium storing instructions for accessing one or more container images in a distributed ledger network environment, wherein upon execution of the instructions by one or more processors, the processors perform operations comprising:

receiving a request from a consumer for accessing the one or more container images in a container image database;

determining whether the one or more container images require to be generated based on a customization performed on one or more container images pre-published in the container image database, wherein the one or more pre-published container images are updated in the one or more nodes of the distributed ledger network, based on at least public keys of publishers of the one or more pre-published container images, one or more smart contracts, and one or more certificates associated with the publishers;

extracting based on the determined requirement, one or more features for performing the customization, based on one or more inputs received from the consumer;

identifying corresponding to the extracted one or more features, a set of pre-published container images from the one or more pre-published container images and associated metadata from respective nodes of the distributed ledger network; and generating the customized one or more container images corresponding to the access request, based on reconciliation of the metadata of the identified set of pre-published container images.

* * * * *